(12) United States Patent
Sampath

(10) Patent No.: US 7,580,467 B2
(45) Date of Patent: *Aug. 25, 2009

(54) SYSTEM AND METHOD FOR MULTIPLE SIGNAL CARRIER TIME DOMAIN CHANNEL ESTIMATION

(75) Inventor: Hemanth Sampath, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/402,597

(22) Filed: Apr. 12, 2006

(65) Prior Publication Data

US 2006/0188034 A1 Aug. 24, 2006

Related U.S. Application Data

(63) Continuation of application No. 10/023,632, filed on Dec. 17, 2001, now Pat. No. 7,058,134.

(51) Int. Cl.
*H04K 1/10* (2006.01)
*H04L 27/28* (2006.01)

(52) U.S. Cl. ................................. 375/260; 375/340
(58) Field of Classification Search ............... 375/219, 375/340, 346, 349, 350, 144, 148, 259–260, 375/216, 347
See application file for complete search history.

(56) References Cited

U.S. PATENT DOCUMENTS 6,654,429 B1 * 11/2003 Li ............................ 375/316

2002/0032015 A1 * 3/2002 Kitakado et al. ......... 455/277.1
2003/0054771 A1 * 3/2003 Chappaz .................... 455/67.1

* cited by examiner

*Primary Examiner*—Shuwang Liu
*Assistant Examiner*—James M Perez
(74) *Attorney, Agent, or Firm*—Joseph P. Curtin; Cool Patent, P.C.

(57) ABSTRACT

The present invention provides a method of characterizing a frequency response of a transmission channel between a transceiver and a subscriber unit. The method includes once per predetermined interval of time, the transceiver transmitting a signal including multiple carriers, a plurality of the carriers including training symbols, a plurality of the carriers including information symbols. The subscriber unit generates frequency response estimates at the frequencies of the carriers including training symbols, each interval of time. The frequency response estimates are converted into a time domain response generating an impulse response once per interval of time. The impulse responses are filtered over a plurality of intervals of time. A channel profile is determined from the filtered impulse responses. The channel profile is converted to the frequency domain generating a channel interpolator. The characterized frequency response is generated from the channel interpolator and the frequency response estimates. The filtering can include averaging the impulse responses over a plurality of intervals of time, accumulating the impulse responses over a plurality of intervals of time, or weighted averaging of the impulse responses over a plurality of intervals of time. The weighted averaging can be dependent upon a phase error between the impulse responses, and/or an amplitude error between the impulse responses.

18 Claims, 8 Drawing Sheets

SYSTEM AND METHOD FOR MULTIPLE SIGNAL CARRIER TIME DOMAIN CHANNEL ESTIMATION

The present patent application is a Continuation of application Ser. No. 10/023,632, filed Dec. 17, 2001 now U.S. Pat. No. 7,058,134.

FIELD OF THE INVENTION

The invention relates generally to methods and devices for wireless communications. More particularly, it relates to techniques for improved wireless transmission channel estimation.

BACKGROUND OF THE INVENTION

FIG. 1 show a prior art wireless system. The system includes modulated carrier signals traveling from a transmitter 110 to a receiver 120 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds. The multiple paths traveled by the modulated carrier signal typically results in fading of the modulated carrier signal. Fading causes the modulated carrier signal to attenuate in amplitude when multiple paths subtractively combine.

In a typical cellular communications system a base station controls communications within a certain geographic coverage area, termed a cell, and subscribers located within the cell communicate with the base station over wireless channels. The system is conventionally designed to operate using one of various air interface standards that determine the specific protocols, modulation techniques, and multiplexing used for the communication. These existing air interface standards, however, have limitations and trade-offs that have motivated researchers to investigate ways to improve the quality and capacity of cellular communication systems.

In cellular communications systems, the wireless spectrum available for use is a limited resource. It is therefore important to make efficient use of the available bandwidth when developing new cellular systems. Any one of various known schemes may be used to divide the spectrum in frequency and/or time, creating a set of communication channels that may be allocated to subscribers. Frequency division multiple access (FDMA) is a method of dividing the wireless spectrum that associates each communication channel with a different single-frequency carrier. Often the single frequency is further divided in time using time division multiple access (TDMA). In TDMA the frequency carrier is divided into successive time frames, each containing a set of time slots. A single communication channel in an FDMA/TDMA system is thus associated with both a specific carrier frequency and a particular time slot.

Orthogonal frequency division multiplexing (OFDM) is a sophisticated method of FDMA/TDMA. In OFDM each channel is associated with a time slot and a set of multiple subcarriers multiplexed together, each subcarrier at a different frequency and each modulated by a signal which varies discretely rather than continuously. The set of subcarrier frequencies associated with each channel is chosen from all subcarrier frequencies available to the system. In any multiplexing scheme, channel assignment, or channel allocation is the process of assigning each subscriber to one or more time intervals and/or to one or more frequency carriers or subcarriers. For example, in an OFDM system, two subscribers might be allocated the same time slot, but different frequency subcarriers; or two subscribers might be allocated the same subcarriers, but different time slots; or two subscribers might be allocated both different subcarriers and different time slots. In any case, the channels allocated to the two subscribers are distinct. Thus, the term channel, in the context of channel allocation, is used to refer to a unique time/frequency portion of the spectrum that the system selects and assigns to particular subscribers for their communication needs.

More generally, however, a communications channel includes spatial components in addition to the time and frequency components. In contrast to the time and frequency components of the channel that are freely selected and assigned to subscribers by the system, the spatial components of the channel are not normally under the control of the system, and cannot be assigned or allocated. Thus channel allocation does not normally include assignment of spatial components of the channel (beamforming systems being an exception). The spatial components of a channel are associated with the path or paths that the wireless signal follows as it propagates through space between the base station and the subscriber. The spatial channel thus depends on the location of the subscriber relative to the base station, and how the environment affects the propagation of the signal (e.g., multipath effects). In addition, the spatial channel will have several spatial subchannels if the base station and/or subscriber has multiple antennas, i.e., in the case of a multiple input, single output (MISO), single input, multiple output (SIMO), or multiple input, multiple output (MIMO) system.

A wireless channel is characterized by a channel response that represents how the transmitted signal is distorted as it propagates through the channel from the transmitter to the receiver. The particular channel response depends on the transmitter, the receiver, and the environment through which the wireless signal passes. For example, the previously described multipath distortions are caused by reflections of the signal from objects in the environment, and Doppler effects distort the signal when there are relative movements between the transmitter, receiver, and objects in the environment.

To compensate for these distortions, communication systems often transmit training sequences over the channel. A training sequence is an information signal that is known a priori by both transmitter and receiver. By comparing the known training sequence with the received training sequence signal that has passed through the channel, the receiver can estimate the channel response. This estimate can then be used by the receiver to compensate for distortions introduced into unknown information signals transmitted over the channel, thereby improving the ability of the receiver to accurately reconstruct the original information signal.

The training sequences are generally transmitted over a subset of the total number of sub-carriers of an OFDM symbol. For example, a single OFDM symbol transmitted within a single time slot may include 1024 sub-carriers. Of the 1024 sub-carriers, 102 of the sub-carriers may include training sequences. Therefore, the channel response at the 102 sub-carriers can be accurately determined. The channel responses of the other 920 sub-carriers can be estimated by interpolating between the nearest training sequence tones.

FIG. 2 shows a prior art OFDM receiver system. The OFDM receiver system includes an antenna 205 and an OFDM receiver 210 that receive training tones for characterizing the channel response at the frequencies of the training tones. The channel responses of the training tone are convolved or interpolated with a predetermined filter 220 within a convolution unit 230 generating channel responses for the sub-carriers (tones) located between the training tones. A limitation of this receiver system is that the interpolation filter is typically optimized for a generic channel, that may not be optimal for other channel settings. For example, an interpolation filter that is optimal for a low delay spread channel may provide poor performance for a high delay spread channel. Additionally, the interpolation filter is generally sensitive to noise and interference.

FIG. 3 shows another prior art OFDM receiver system. This OFDM receiver system includes an antenna 305 and an OFDM receiver 310 that receive training tones for characterizing the channel response at the frequencies of the training tones. The frequency responses of the training tones for each training time slot are converted to the time domain through an inverse fast fourier transform (IFFT) unit 320. The time domain response is generally peak detected by a peak detector 330 to eliminate some of the effects of noise. Again, the peak detection occurs for every training time slot. The peak detected response is converted back to the frequency domain through a fast fourier transform (FFT) unit 340. The characterized channel response is generated by the FFT unit 340.

The primary limitation of the receiver system of FIG. 3 is sensitivity to noise and interference. If a channel is fading, the peak detector 330 can confuse noise and channel multipath. As a result, the time-domain response can be incorrectly estimated, leading to degradation of the estimation of the channel. Another limitation is implementation complexity. The IFFT unit 320 and the FFT unit 340 are generally complex and operationally require large amounts of computation time.

The prior art training systems are generally sensitive to noise and interference. Fading and multipath can also cause problems. Additionally, multiple carrier systems (such as OFDM) can suffer from time jitter, which limits the performance of prior art training systems.

It is desirable to have a method and system that provides a robust estimation of a transmission channel that is less sensitive to noise and is inexpensive to implement.

SUMMARY OF THE INVENTION

The invention includes an apparatus and a method for estimating a transmission channel between a transmitter and a receiver of a multiple carrier system.

A first embodiment of the invention includes a method of characterizing a frequency response of a transmission channel between a transceiver and a subscriber unit. The method includes once per predetermined interval of time, the transceiver transmitting a signal including multiple carriers, a plurality of the carriers including training symbols, a plurality of the carriers including information symbols. The subscriber unit generates frequency response estimates at the frequencies of the carriers including training symbols, each interval of time. The frequency response estimates are converted into a time domain response generating an impulse response once per interval of time. The impulse responses are filtered over a plurality of intervals of time. A channel profile is determined from the filtered impulse responses. The channel profile is converted to the frequency domain generating a channel interpolator. The characterized frequency response is generated from the channel interpolator and the frequency response estimates.

The filtering can include averaging the impulse responses over a plurality of intervals of time, accumulating the impulse responses over a plurality of intervals of time, or weighted averaging of the impulse responses over a plurality of intervals of time. The weighted averaging can be dependent upon a phase error between the impulse responses, and/or an amplitude error between the impulse responses.

Determining a channel profile from the filtered impulse responses can include peak detecting the filtered impulse responses. More specifically, determining a channel profile from the filtered impulse responses can include detecting elements of the filtered impulse response having amplitudes greater than a predetermined threshold.

Generating the characterized frequency response from the channel interpolator and the frequency response estimates can include convolving the channel interpolator with the frequency response estimates.

The channel interpolator can be re-determined after the transmission of a predetermined number of transmitted signals. Alternatively, the channel interpolator can be determined only a single time and remain fixed during the transmission of many signals.

Another embodiment of the invention includes a method of characterizing a frequency response of a transmission channel between a transceiver and a subscriber unit. The method includes once per predetermined interval of time, the transceiver transmitting a signal including carriers, a plurality of the carriers including training symbols, a plurality of the carriers including information symbols. The subscriber unit generates frequency response estimates at the frequencies of the carriers including training symbols, each interval of time. The frequency response estimates are filtered over a plurality of intervals of time. The filtered frequency response estimates are converted into a time domain response generating an impulse response once per interval of time. A channel profile is determined by peak detecting the impulse response. The channel profile is converted to the frequency domain creating a channel interpolator. The characterized frequency response is generated from the channel interpolator and the frequency response estimates.

Another embodiment of the invention include a method of characterizing a frequency response of a transmission channel between a transceiver and a subscriber unit. The method includes once per predetermined interval of time, the transceiver transmitting a signal including multiple carriers, a plurality of the carriers including training symbols, a plurality of the carriers including information symbols. The subscriber unit generates frequency response estimates at the frequencies of the carriers comprising training symbols each interval of time. The frequency response estimates are converted into a time domain response generating an impulse response once per interval of time. The impulse responses are filtered over a plurality of intervals of time. A channel is determined by peak detecting the filtered impulse responses. The channel is converted to the frequency domain creating the characterized frequency response.

Another embodiment of the invention includes a method of characterizing a frequency response of a transmission channel between a transceiver and a subscriber unit. The method includes once per predetermined interval of time, the transceiver transmitting a signal including multiple carriers, a plurality of the carriers including training symbols, a plurality of the carriers including information symbols. The subscriber unit generates frequency response estimates at the frequencies of the carriers comprising training symbols each interval of time. The frequency response estimates are filtered over a plurality of intervals of time. The filtered frequency response estimates are converted into a time domain response generating a filtered impulse response once per interval of time. A channel is determined by peak detecting the filtered impulse responses. The channel is converted to the frequency domain creating the characterized frequency response.

The filtering the frequency response estimates over a plurality of intervals of time can include averaging the frequency response estimates over a plurality of intervals of time, accumulating the frequency response estimates over a plurality of intervals of time, or weighted averaging of the frequency response estimates over a plurality of intervals of time.

Other aspects and advantages of the present invention will become apparent from the following detailed description, taken in conjunction with the accompanying drawings, illustrating by way of example the principles of the invention.

DETAILED DESCRIPTION

Figure 1:
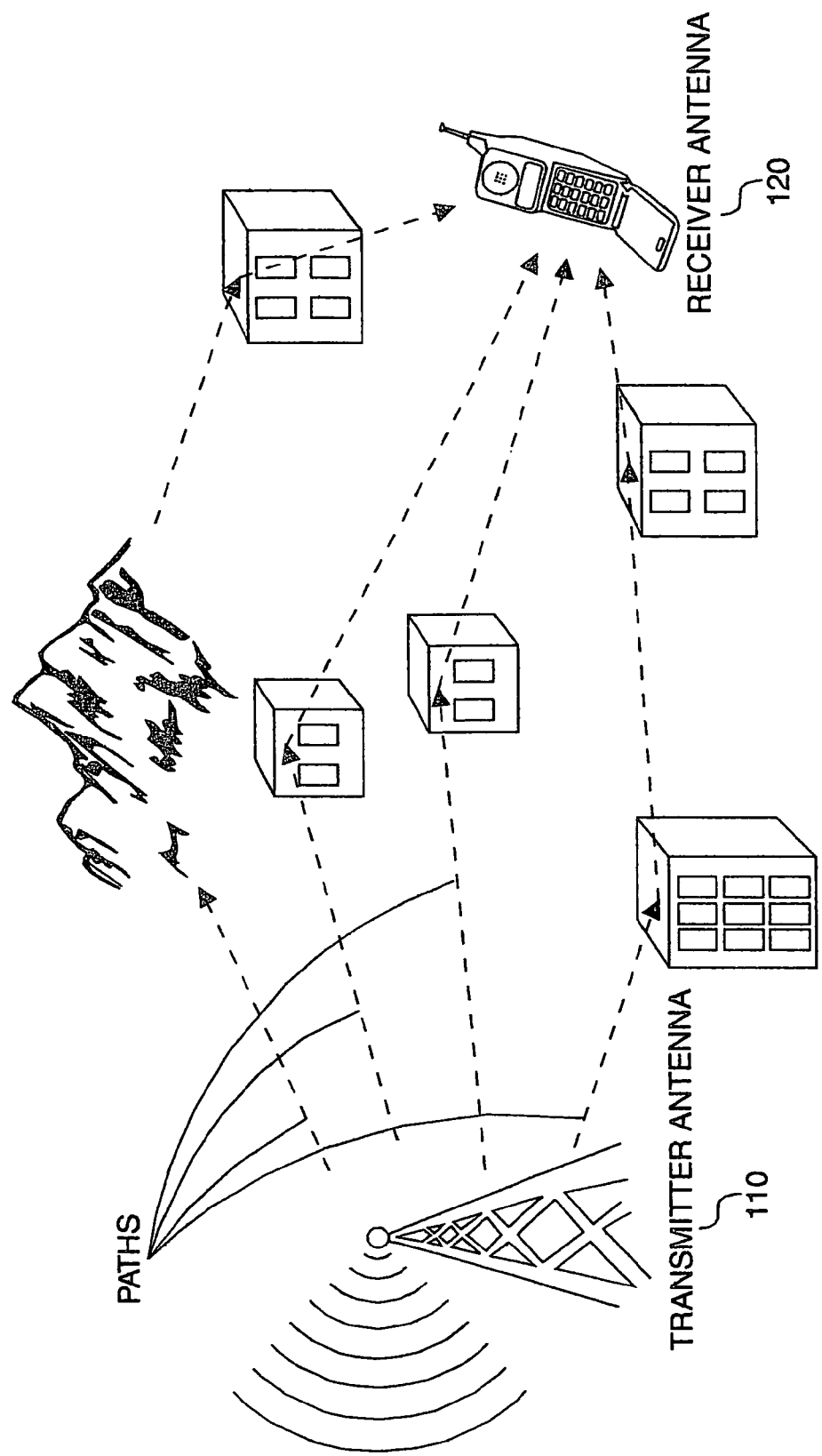
FIG. 1 shows a prior art wireless system that includes multiple paths from a system transmitter to a system receiver.
Figure 2:
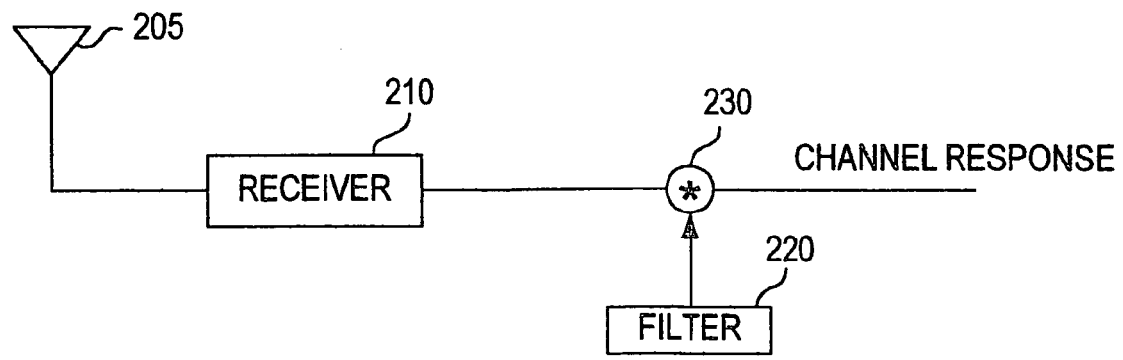
FIG. 2 shows a prior art OFDM receiver and channel response estimator.
Figure 3:
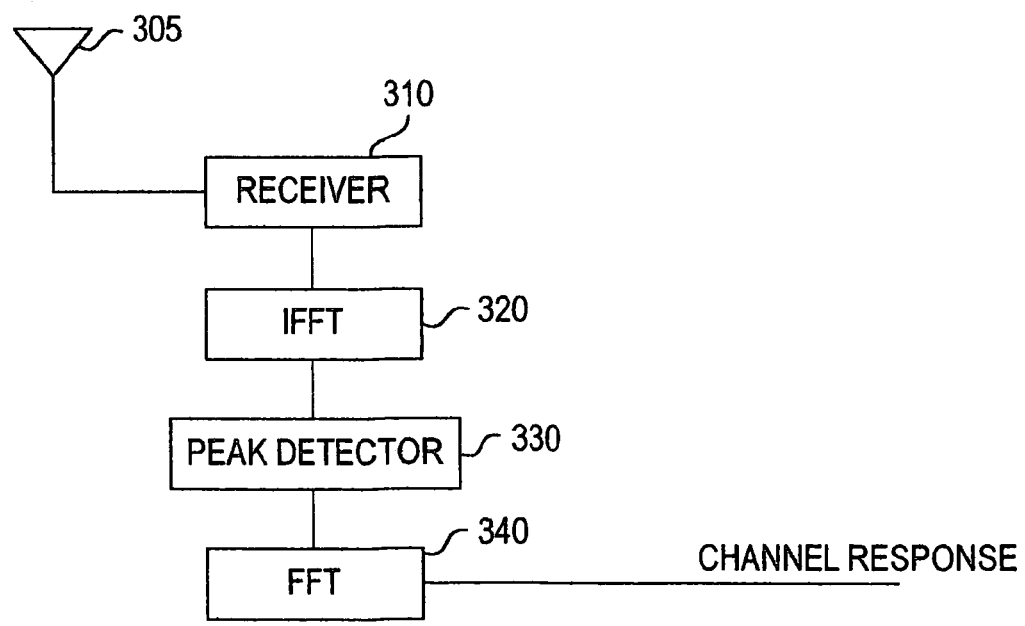
FIG. 3 shows another prior art OFDM receiver and channel response estimator.

As shown in the drawings for purposes of illustration, the invention is embodied in an apparatus and a method for estimating a transmission channel between a transmitter and a receiver of a multiple carrier system.

Particular embodiments of the present invention will now be described in detail with reference to the drawing figures. The techniques of the present invention may be implemented in various different types of wireless communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. The subscribers may be mobile or fixed. Exemplary subscribers include devices such as portable telephones, car phones, and stationary receivers such as a wireless modem at a fixed location.

The base station is provided with multiple antennas that allow antenna diversity techniques and/or spatial multiplexing techniques. In addition, each subscriber can be equipped with multiple antennas that also permit spatial multiplexing and/or antenna diversity. Although the techniques of the present invention apply to point-to-multipoint systems, they are not limited to such systems, but apply to any wireless communication system having at least two devices in wireless communication. Accordingly, for simplicity, the following description will focus on the invention as it is applied to a single transmitter-receiver pair, even though it is understood that it applies to systems with any number of such pairs.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) cause variations of channel response over the frequency bandwidth, and these variations may change with time as well.

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

Figure 4:
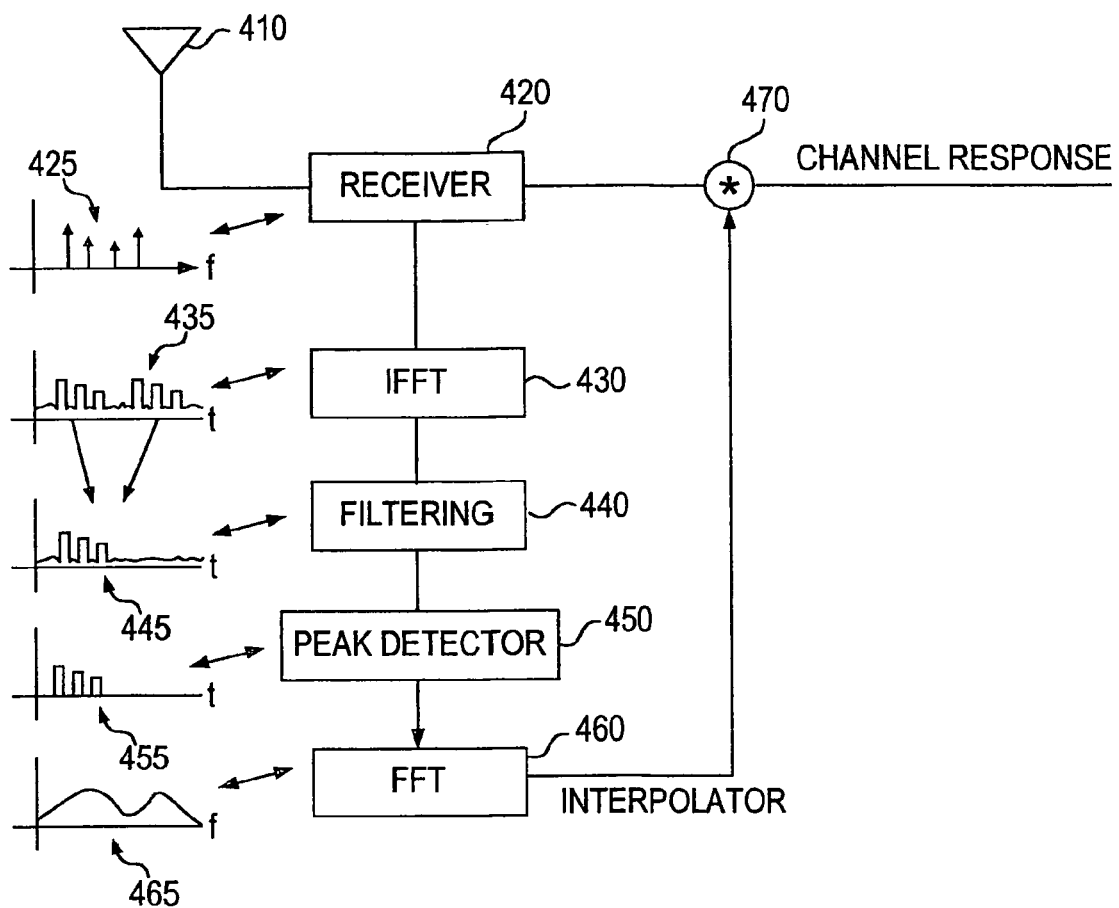
FIG. 4 shows an embodiment of the invention.

FIG. 4 shows an embodiment of the invention. An antenna 410 receives a transmitted multiple carrier signal. The multiple carrier signal generally includes both data tones and training tones. A multiple carrier receiver 420 demodulates the received multiple carrier signal, and generates a base band frequency response 425 of the received multiple carrier signal. As previously described, the base band frequency response 425 only includes channel response estimates for the training tones. The channel response estimates for the data tones are determined by interpolating between the channel responses of the training tones.

An IFFT unit 430 generates a time response 435 of the base band frequency response.

A filtering unit 440 filters the power or amplitude of the time response 435 over several successive time slots, generating a filtered power delay profile 445. The filtered power delay profile 445 represents the average power gain of the transmission channel as a function of time delay. The filtering can include a weighted averaging of the power or amplitude of the time responses of several time slots worth of time responses.

The weighted averaging can be implemented so that more recent estimates of the amplitudes of the time responses 435 are given more weight in the averaging than less recent estimates. Such an implementation is beneficial in an environment in which the transmission channel is dynamic.

The filtering or averaging process also averages the effects of noise, interference and time jitter of OFDM symbols, thereby minimizing the effects of noise, interference and time jitter of OFDM symbols.

The filtered power delay profile 445 is peak detected by a peak detector 450 generating a peak detected power profile response 455. The peak detector 450 detects the dominant transmission channel paths having the greatest gain, and therefore, the most energy. The peak detection can include detecting channel paths having an average gain greater than a predetermined threshold. The filtered power delay profile 445 depicts the average gain of the transmission channel multipaths. The power delay profile is generally static over time, and generally only needs to be estimated once per several intervals of time.

The peak detected power profile response 455, or an appropriately scaled version of the peak detected power profile response 455, is converted to the frequency domain through an FFT unit 460. The FFT unit 460 generates a channel interpolator response 465. The channel interpolator response 465 can be generated once per every predetermined number of OFDM time slots. That is, the determination of the channel interpolator response 465 does not have to be computed in real-time. Rather, the computation of the channel interpolator response 465 need only be repeated if there is a significant change in the peak detected power profile response.

The original base band frequency response 425 is then convolved or interpolated with the interpolator response 465 to generate the estimated channel responses for the data tones. The estimated channel responses are generated for every OFDM time slot.

The invention is an improvement over the prior art because the invention optimizes the channel interpolator based upon the power delay profile of the transmission channel. As previously described, the power delay profile is the average power gain of the channel as a function of time delay. The filtering or averaging provides for an estimate of the power delay profile that is less sensitive to noise, interference and time-jitter of multiple carrier symbols. Therefore, performance improvements can be realized over prior art systems that use a pre-determined channel interpolator.

The computation of the channel interpolator can be performed a single time. Alternatively, the channel interpolator can be computed once every predetermined period of time, or the channel interpolator can be calculated every transmission time period or the calculation can be based upon a running average of the time responses 435.

Figure 5:
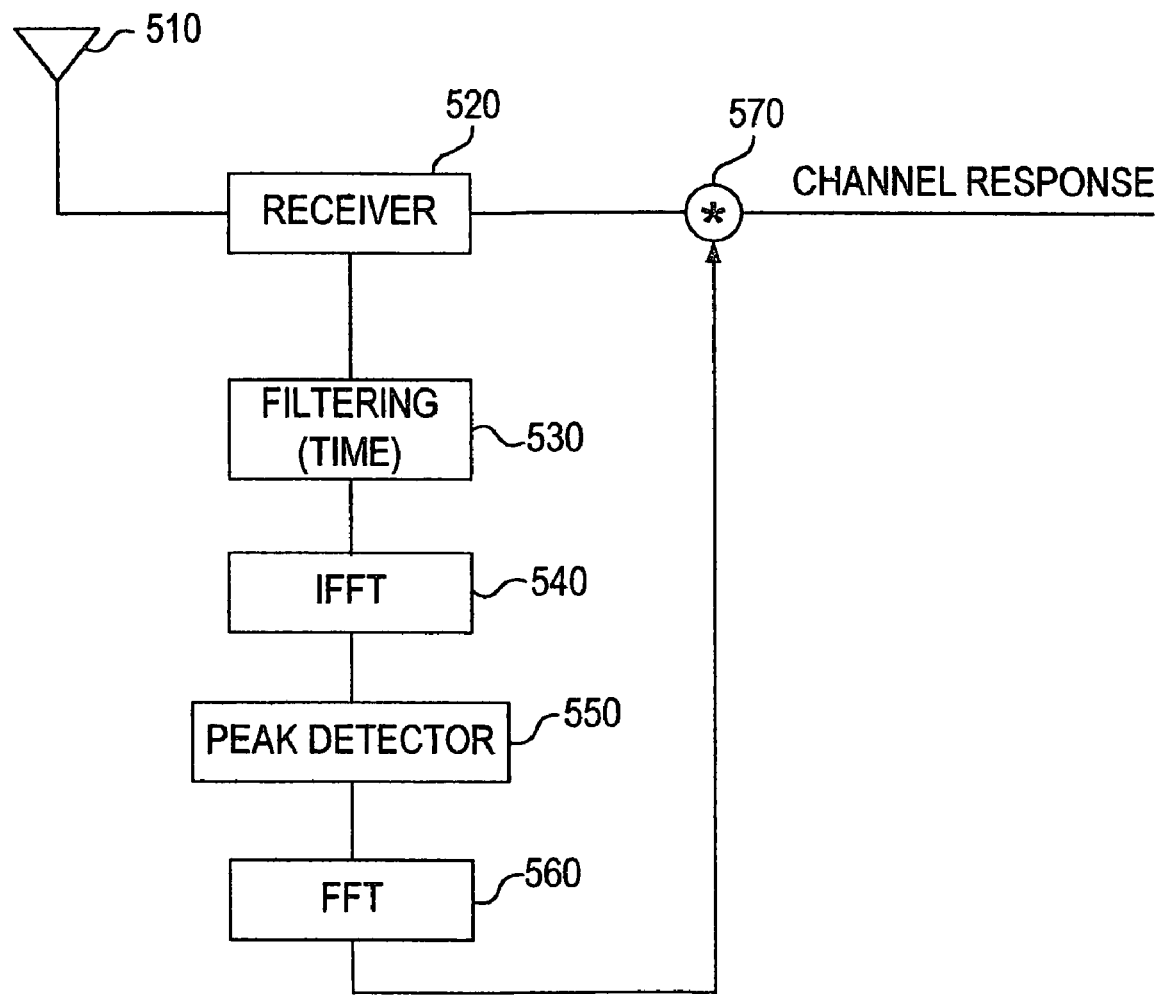
FIG. 5 shows another embodiment of the invention.

FIG. 5 shows another embodiment of the invention. The embodiment of FIG. 5 is similar to the embodiment of FIG. 4, except the filtering takes place in the frequency domain rather than in the time domain. Another embodiment of the invention includes filtering occurring in both the frequency domain and the time domain.

An antenna 510 receives a transmitted multiple carrier signal. The multiple carrier signal generally includes both data tones and training tones. A multiple carrier receiver 520 demodulates the received multiple carrier signal, and generates a base band frequency response of the received multiple carrier signal. As previously described, the base band frequency response only includes channel response estimates for the training tones. The channel response estimates for the data tones are determined by interpolating between the channel responses of the training tones.

A filter 530 filters or averages the base band frequency response over several OFDM time slots. That is, the filter 530 essentially averages the base band frequency response 525 over several OFDM time slots, generating a filtered base band frequency response.

The averaged base band frequency response is converted to the time domain through an IFFT unit 540, generating a filtered impulse response.

The filtered impulse response is peak detected by a peak detector unit 550 generating a channel profile. The peak detector unit 550 detects according to a power or amplitude level of the filtered impulse response.

The channel profile 555 is converted to the frequency domain through an FFT unit 560, generating an interpolator response.

The original base band frequency response 525 is then convolved or interpolated with the interpolator response to generate the estimated channel responses for the data tones. The estimated channel responses are generated for every OFDM time slot.

Figure 6:
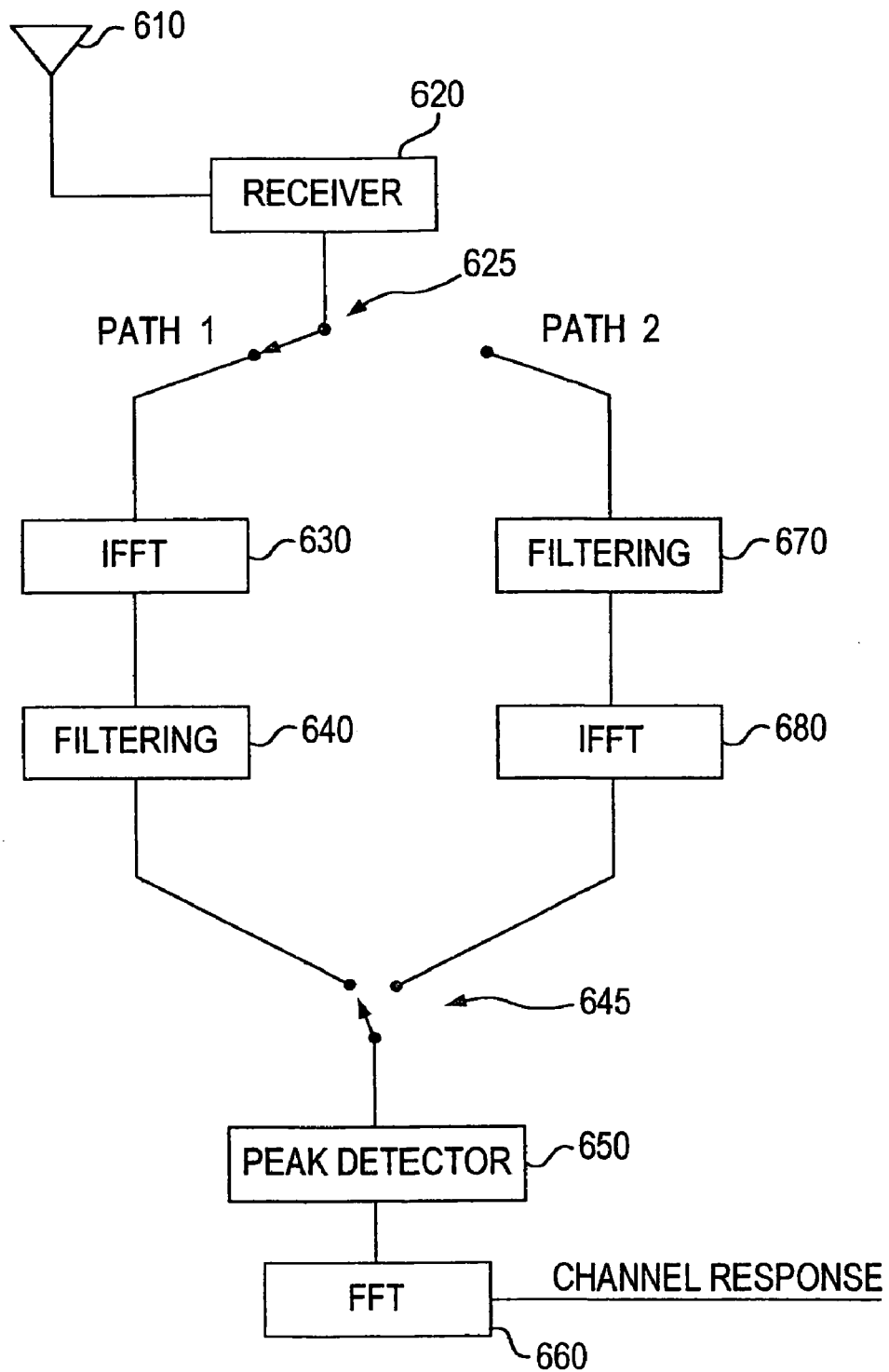
FIG. 6 shows another embodiment of the invention.

FIG. 6 shows another embodiment of the invention. This embodiment includes generation of the estimated channel response without a convolution or interpolation of an original base band frequency response. That is, the estimated channel responses are generated directly through filtering, domain transforming and peak detecting of the base band frequency responses. The filtering or averaging is performed on a running window of either the base band frequency responses or the time responses.

The embodiment of FIG. 6 generally includes two signal paths. A first signal path (path1) includes filtering of the time responses. As previously mentioned, this generally includes a running average. A second signal path (path2) includes filtering of the frequency responses. Again, this generally includes a running average.

An antenna 610 receives a transmitted multiple carrier signal. The multiple carrier signal generally includes both data tones and training tones. A multiple carrier receiver 620 demodulates the received multiple carrier signal, and generates a base band frequency response of the received multiple carrier signal. As previously described, the base band frequency response only includes channel response estimates for the training tones.

A first switch 625 and a second switch 645 are included to indicate an option of processing through the first signal path or the second signal path. This embodiment provides an option between the first signal path or the second signal path. It is to be understood that other embodiments include only the first signal path, or only the second signal path.

The first signal path (path1) includes an IFFT unit 630 and a filtering unit 640. The filtering unit filters or averages (this can include weighted averages) the time responses. The filtering is essentially a running average over a plurality of time intervals. The second signal path (path2) includes a filtering unit 670 and an IFFT unit 680. The filtering unit 670 filters or averages the frequency response.

A peak detector 650 detects predetermined power or amplitude levels of either a filtered power delay profile generated by the filtering unit 640, or the filtered impulse response generated by IFFT unit 680.

The peak detected signals generated by the peak detector 650 are transformed to the frequency domain, generating the estimated channel response through an FFT unit 660.

As previously stated, the filtering is essentially a running average over a plurality of time intervals (the number of time intervals is determined by a predetermined window). The filtering process generally involves a weighted averaging of the time domain responses. The size of the weightings and the size of the predetermined window are generally determined by the time correlation, the phase error between the time domain response, and/or the amplitude errors between the time domain responses.

Time Correlation

The time correlation between the time domain response can be used to determine the window size of the filtering or averaging. For example, if the time correlation between the time domain responses is high (suggesting that the transmission channel is changing vary slowly) the window size can be very large. If the time correlation is small, the window size can also be small. An embodiment includes the window size being determined through the use of a look up table that generates a desired window size based upon the time correlation between time domain response.

The time correlation between the time domain response can also be used to determine weighting of the filtering or averaging. For example, weighting of more recent time responses can be much greater than less recent time samples for a small time correlation.

Phase Errors

Generally, the transceiver includes a transceiver local oscillator, and the receiver (subscriber unit) also includes a local oscillator. Typically, the phase of a signal generated by the receiver local oscillator jitters with respect to the phase of a signal generated by the transceiver local oscillator. This jitter causes phase errors between the time domain responses. The phase errors can be measured, and be used in determining the weighting used in the averaging. That is, well known methods of phase noise measurement can be used to determine the phase errors between the time domain responses, and the weighting can be used to correct for the phase errors.

Amplitude Errors

The receiver (subscriber unit) generally includes an automatic gain control. The automatic gain control, can introduce amplitude errors between the time domain responses due to fading in the transmission channel.

The time correlation and the amplitude errors can be used to either disable the weighted averaging or reduce the window size to one. For example, if the time correlation is very low and the amplitude errors are very large, the transmission channel is changing very quickly. Time averaging can hinder the performance of the system if the transmission channel is changing very quickly. Therefore, if a transmission channel is detected to be changing very quickly, the time averaging can be turned off. That is, the window size can be minimized, or equivalently, the weighting for all previous time domain responses can be set to zero.

Figure 7:
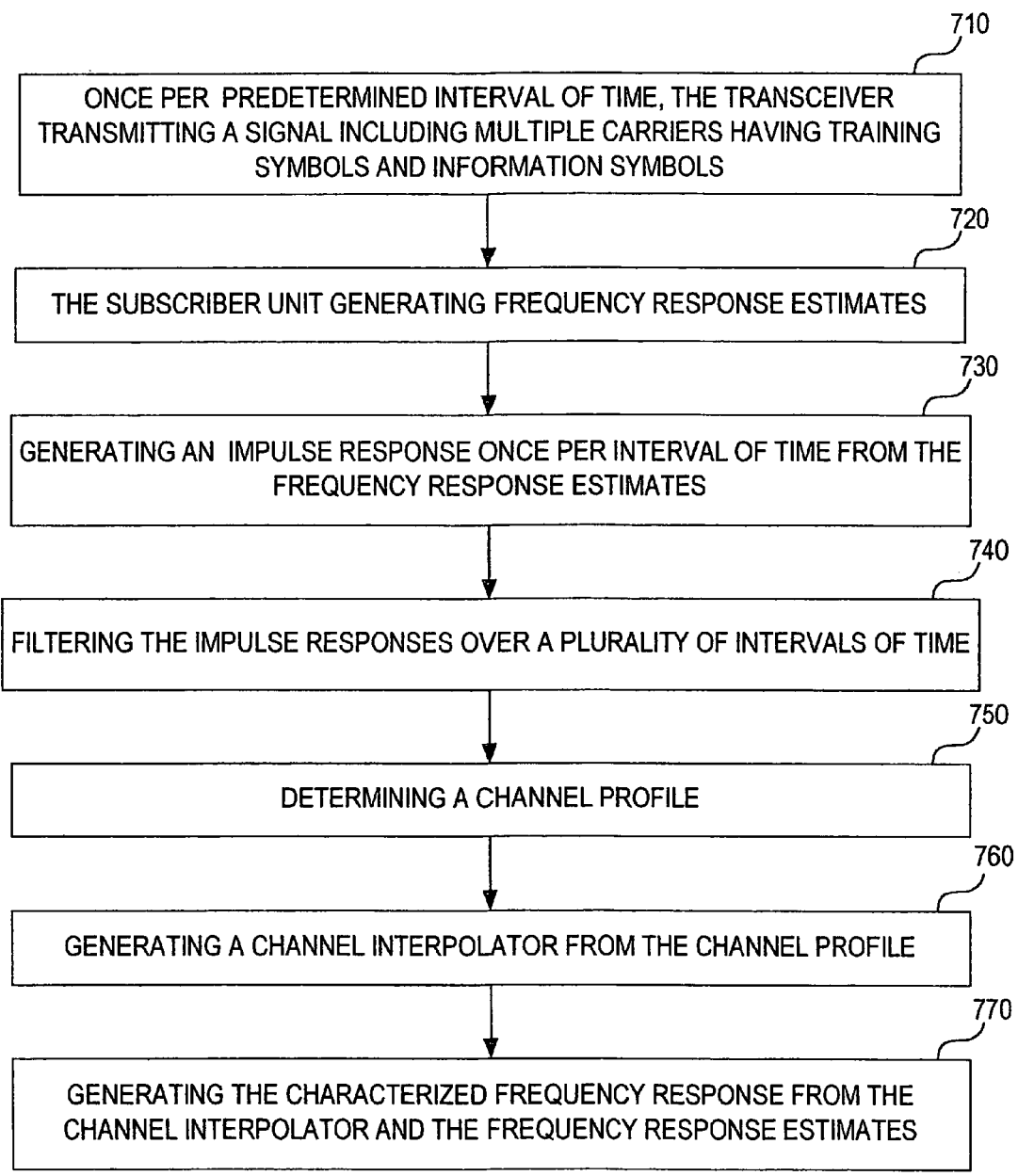
FIG. 7 is a flow chart showing acts include within a method according to the invention.

FIG. 7 is a flow chart showing acts included within a method according to the invention. This method is generally associated with the embodiment shown in FIG. 4.

A first step 710 includes once per predetermined interval of time, the transceiver transmitting a signal including multiple carriers, a plurality of the carriers including training symbols, a plurality of the carriers including information symbols.

A second step 720 includes the subscriber unit generating frequency response estimates at the frequencies of the carriers comprising training symbols each interval of time.

A third step 730 includes converting the frequency response estimates into a time domain response generating an impulse response once per interval of time.

A fourth step 740 includes filtering the impulse responses over a plurality of intervals of time.

A fifth step 750 includes determining a channel profile from the filtered impulse responses.

A sixth step 760 includes converting the channel profile to the frequency domain generating a channel interpolator.

A seventh step 770 includes generating the characterized frequency response from the channel interpolator and the frequency response estimates.

Figure 8:
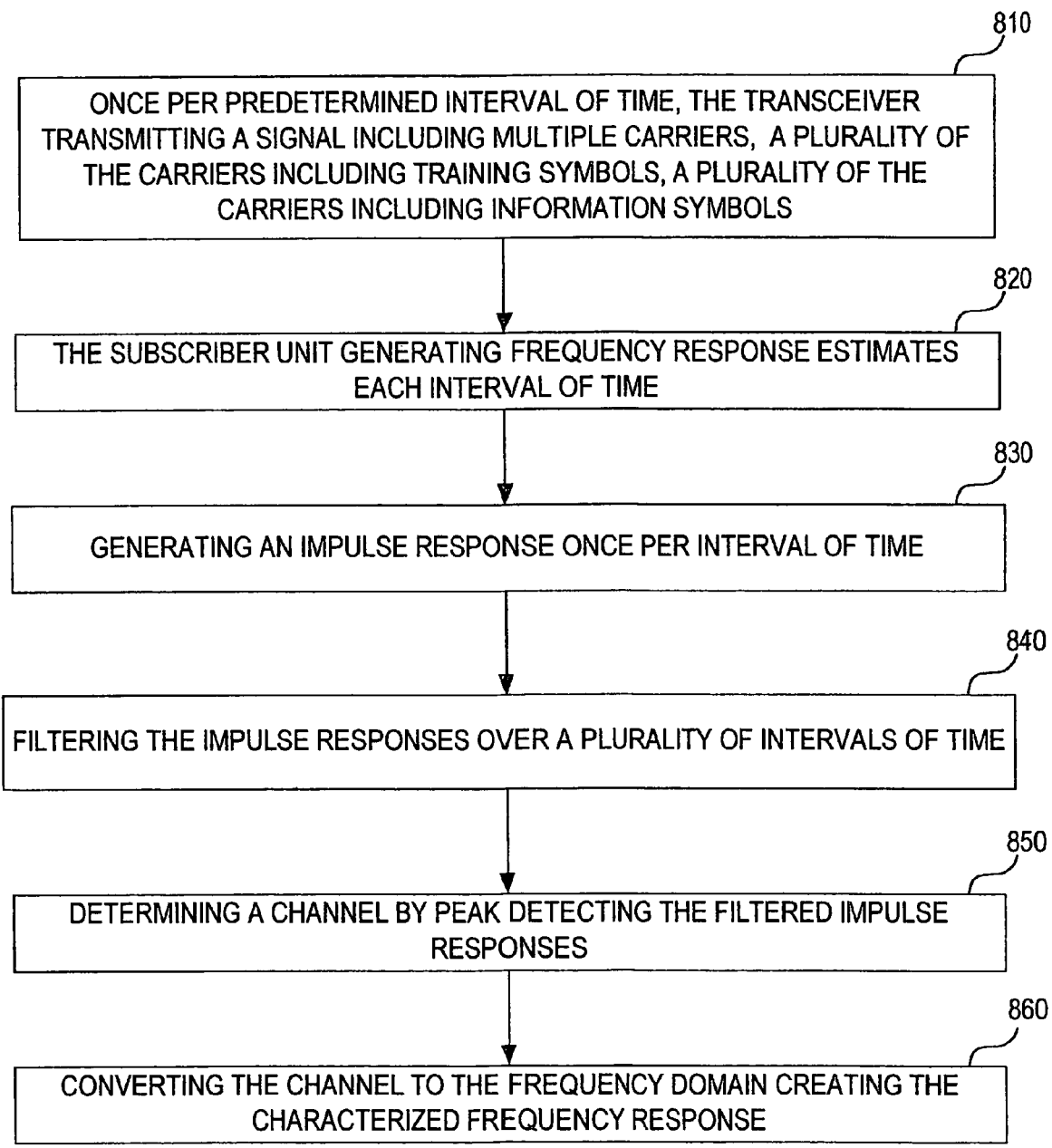
FIG. 8 is a flow chart showing acts include within another method according to the invention.

FIG. 8 is a flow chart showing acts included within another method according to the invention. This method is generally associated with the embodiment of the first signal path (path1) of FIG. 6.

A first step 810 includes once per predetermined interval of time, the transceiver transmitting a signal including multiple carriers, a plurality of the carriers including training symbols, a plurality of the carriers including information symbols A second step 820 the subscriber unit generating frequency response estimates at the frequencies of the carriers comprising training symbols each interval of time.

A third step 830 includes converting the frequency response estimates into a time domain response generating an impulse response once per interval of time.

A fourth step 840 includes filtering the impulse responses over a plurality of intervals of time.

A fifth step 850 includes determining a channel by peak detecting the filtered impulse responses.

A sixth step 860 includes converting the channel to the frequency domain creating the characterized frequency response.

Figure 9:
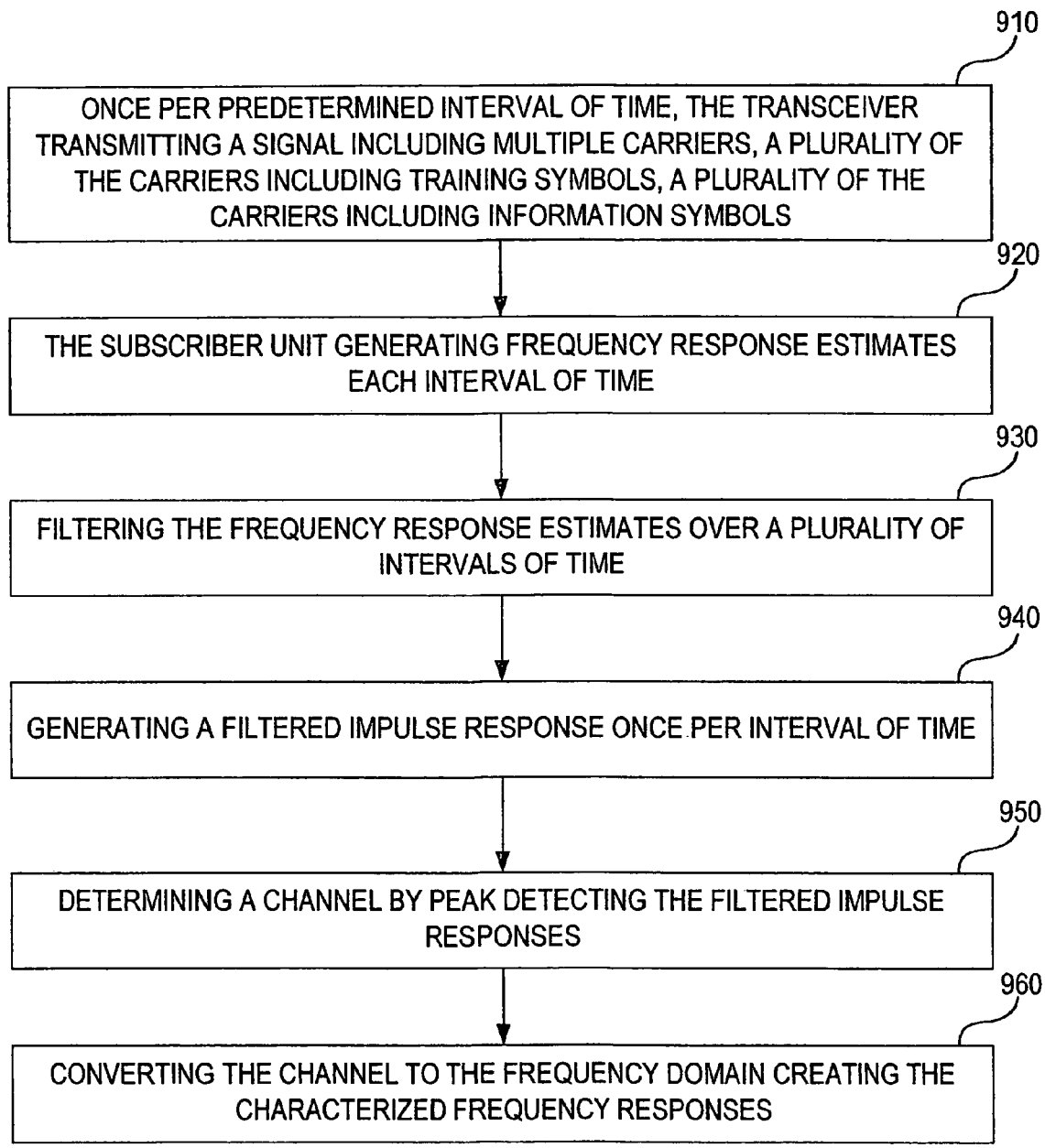
FIG. 9 is a flow chart showing acts include within another method according to the invention.

FIG. 9 is a flow chart showing acts included within another method according to the invention. This method is generally associated with the embodiment of the second signal path (path2) of FIG. 6.

A first step 910 includes once per predetermined interval of time, the transceiver transmitting a signal including multiple carriers, a plurality of the carriers including training symbols, a plurality of the carriers including information symbols.

A second step 920 includes the subscriber unit generating frequency response estimates at the frequencies of the carriers comprising training symbols each interval of time.

A third step 930 includes filtering the frequency response estimates over a plurality of intervals of time, A fourth step 940 includes converting the filtered frequency response estimates into a time domain response generating a filtered impulse response once per interval of time.

A fifth step 950 includes determining a channel by peak detecting the filtered impulse responses.

A sixth step 960 includes converting the channel to the frequency domain creating the characterized frequency response.

Although specific embodiments of the invention have been described and illustrated, the invention is not to be limited to the specific forms or arrangements of parts so described and illustrated. The invention is limited only by the claims.

What is claimed:

1. An apparatus for characterizing a frequency response of a transmission channel between a transceiver and a subscriber unit, the apparatus comprising:

means for receiving a signal transmitted once per predetermined interval of time, the signal comprising multiple carriers, a plurality of the carriers comprising training symbols, a plurality of the carriers comprising information symbols;

means for generating frequency response estimates at the frequencies of the carriers comprising training symbols each interval of time;

means for converting the frequency response estimates into a time domain response to generate an impulse response once per interval of time;

means for filtering the impulse responses over a plurality of intervals of time to generate a power delay profile comprising an average power gain of the channel as a function of time;

means for determining the channel profile from the filtered impulse responses;

means for converting the channel profile to the frequency domain to generate a channel interpolator; and means for generating the characterized frequency response from the channel interpolator and the frequency response estimates.

2. An apparatus as claimed in claim 1, said means for filtering the impulse responses over a plurality of intervals of time comprising means for averaging the impulse responses over a plurality of intervals of time.

3. An apparatus as claimed in claim 1, said means for filtering the impulse responses over a plurality of intervals of time comprising means for accumulating the impulse responses over a plurality of intervals of time.

4. An apparatus as claimed in claim 1, said means for filtering the impulse responses over a plurality of intervals of time comprising means for weighted averaging of the impulse responses over a plurality of intervals of time.

5. An apparatus as claimed in claim 4, said means for weighted averaging provides a weighted average based at least in part on a phase error between the impulse responses or an amplitude error between the impulse responses, or combinations thereof.

6. An apparatus as claimed in claim 1, said means for determining a channel profile from the filtered impulse responses comprising means for peak detecting the filtered impulse responses.

7. An apparatus as claimed in claim 1, said means for determining a channel profile from the filtered impulse responses comprising means for detecting elements of the filtered impulse response having amplitudes greater than a predetermined threshold.

8. An apparatus as claimed in claim 1, said means for generating the characterized frequency response from the channel interpolator and the frequency response estimates comprising means for convolving the channel interpolator with the frequency response estimates.

9. An apparatus as claimed in claim 1, wherein the channel interpolator is redetermined after the transmission of a predetermined number of transmitted signals.

10. An apparatus as claimed in claim 1, wherein the channel interpolator is determined a single time and remains fixed during the transmission of two or more signals.

11. An apparatus as claimed in claim 1, said means for converting the frequency response estimates into a time domain response to generate an impulse response once per interval of time comprising means for generating an impulse response by performing an IFFT on the frequency response estimates once per interval of time.

12. An apparatus as claimed in claim 1, said means for converting the channel profile to the frequency domain to generate a channel interpolator comprising means for performing an FFT on the channel profile generating a channel interpolator.

13. An apparatus for characterizing a frequency response of a transmission channel between a transceiver and a subscriber unit, the apparatus comprising:
means for receiving a signal transmitted once per predetermined interval of time, the signal comprising multiple carriers, a plurality of the carriers comprising training symbols, a plurality of the carriers comprising information symbols;
means for generating frequency response estimates at the frequencies of the carriers comprising training symbols each interval of time;
means for converting the frequency response estimates into a time domain response to generate an impulse response once per interval of time;
means for filtering the impulse responses over a plurality of intervals of time to generate a power delay profile comprising an average power gain of the channel as a function of time;
means for determining a channel by peak detecting the filtered impulse responses; and
means for converting the channel to the frequency domain to create the characterized frequency response.

14. An apparatus for characterizing a frequency response of a transmission channel between a transceiver and a subscriber unit, the apparatus comprising:
means for receiving a signal transmitted once per predetermined interval of time, the signal comprising multiple carriers, a plurality of the carriers comprising training symbols, a plurality of the carriers comprising information symbols;
means for generating frequency response estimates at the frequencies of the carriers comprising training symbols each interval of time;
means for filtering the frequency response estimates over a plurality of intervals of time to generate a power delay profile comprising an average power gain of the channel as a function of time;
means for converting the filtered frequency response estimates into a time domain response to generate a filtered impulse response once per interval of time;
means for determining a channel by peak detecting the filtered impulse responses;
means for converting the channel to the frequency domain to create the characterized frequency response; and
means for convolving the channel interpolator with the frequency response estimates to generate the characterized frequency response.

15. An apparatus as claimed in claim 14, said means for filtering the frequency response estimates over a plurality of intervals of time comprising means for averaging the frequency response estimates over a plurality of intervals of time.

16. An apparatus as claimed in claim 14, said means for filtering the impulse responses over a plurality of intervals of time comprising means for accumulating the frequency response estimates over a plurality of intervals of time.

17. An apparatus as claimed in claim 14, said means for filtering the frequency response estimates over a plurality of intervals of time comprising means for weighted averaging of the frequency response estimates over a plurality of intervals of time.

18. An apparatus for characterizing a frequency response of a transmission channel between a transceiver and a subscriber unit, the apparatus comprising:
means for receiving a signal transmitted once per predetermined interval of time, the signal comprising multiple carriers, a plurality of the carriers comprising training symbols, a plurality of the carriers comprising information symbols;
means for generating frequency response estimates at the frequencies of the carriers comprising training symbols each interval of time;
means for converting the frequency response estimates into a time domain response to generate an impulse response once per interval of time, said converting means filtering the impulse responses over a plurality of intervals of time to generate a power delay profile comprising an average power gain of the channel as a function of time;
means for determining a channel profile from the filtered impulse responses;
means for converting the channel profile to the frequency domain to generate a channel interpolator; and
means for generating the characterized frequency response from the channel interpolator and the frequency response estimates.

\* \* \* \* \*

UNITED STATES PATENT AND TRADEMARK OFFICE
CERTIFICATE OF CORRECTION

PATENT NO. : 7,580,467 B2    Page 1 of 1
APPLICATION NO. : 11/402597
DATED : August 25, 2009
INVENTOR(S) : Hemanth Sampath It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Fourteenth Day of September, 2010

David J. Kappos
*Director of the United States Patent and Trademark Office*